T. F. HAMILTON.
CORSETS.

No. 195,271. Patented Sept. 18, 1877.

Witnesses
J. H. Shinnuay
Clara Broughton.

Thos. F. Hamilton,
Inventor.
By Atty.

UNITED STATES PATENT OFFICE.

THOMAS F. HAMILTON, OF NEW HAVEN, CONNECTICUT.

IMPROVEMENT IN CORSETS.

Specification forming part of Letters Patent No. 195,271, dated September 18, 1877; application filed June 12, 1877.

*To all whom it may concern:*

Be it known that I, THOMAS F. HAMILTON, of New Haven, in the county of New Haven and State of Connecticut, have invented a new Improvement in Corsets; and I do hereby declare the following, when taken in connection with the accompanying drawings and the letters of reference marked thereon, to be a full, clear, and exact description of the same, and which said drawings constitute part of this specification, and represent, in—

Figure 1:
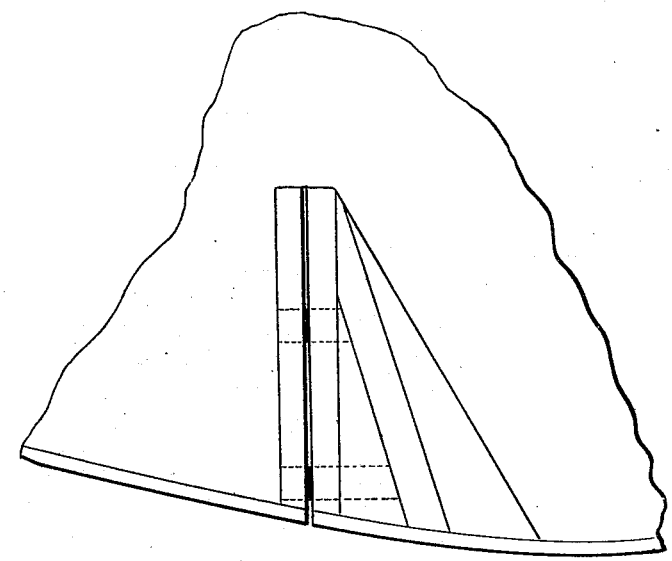
Figure 2:

Figure 1, a side view of the hip portion of a corset, showing the improvement; Fig. 2, a vertical section through the pocket.

This invention relates to an improvement in corsets, the object being to make the corset self-adjustable over the hips.

It consists in a divided gore, or a gore detached at one edge, combined with transverse elastic strips across the said slit or division, attached to the two parts, as more fully hereinafter described.

As shown in Fig. 1, the gore is made double thickness, or with transverse pockets $a$, as seen in Fig. 2. Through each of these pockets a strip of elastic material, $b$, is introduced, and secured at each end. The pockets allow of the free play of the elastic material throughout its length. Hence, as the strain is brought upon the gore, the elastic strips will yield accordingly, and react when the strain is removed. The gore is made of sufficient size so that, in its natural condition, the slit will be closed, or nearly so.

I do not wish to be understood as broadly claiming an elastic gore in corsets, as such, I am aware, is not new; but What I do claim as my invention, and desire to secure by Letters Patent, is—

One or more gores of corsets, vertically slit or detached at one edge, combined with transverse elastic strips arranged through pockets in said gore, and secured at each end and over said slit, substantially as described.

THOS. F. HAMILTON.

Witnesses:
JOHN E. EARLE,
CLARA BROUGHTON.